(12) United States Patent
Hendey

(10) Patent No.: US 6,363,782 B1
(45) Date of Patent: Apr. 2, 2002

(54) TWIN CHECK VALVE WATER METER

(76) Inventor: Arthur Hendey, 38600 Hill St., Cherry Valley, CA (US) 92223

( * ) Notice: Subject to any disclaimer, the term of this patent is extended or adjusted under 35 U.S.C. 154(b) by 0 days.

(21) Appl. No.: 09/517,209

(22) Filed: Mar. 2, 2000

(51) Int. Cl.⁷ .............................................. G01F 15/00
(52) U.S. Cl. ...................................................... 73/276
(58) Field of Search .......................... 73/195, 197, 198, 73/276, 264

(56) References Cited

U.S. PATENT DOCUMENTS

| | | | |
|---|---|---|---|
| 4,614,113 A | * 9/1986 | Daghe et al. | 73/201 |
| 5,085,076 A | * 2/1992 | Engelmann | 73/197 |
| 5,559,289 A | * 9/1996 | Brunson, IV et al. | 73/275 |
| 5,827,959 A | * 10/1998 | Clanin | 73/198 |
| 5,831,158 A | * 11/1998 | Schloetterer et al. | 73/197 |

* cited by examiner

Primary Examiner—Max Noori
(74) Attorney, Agent, or Firm—Morland C. Fischer

(57) ABSTRACT

A twin check valve water meter having a water register and being connected between a source of water (e.g. a fire hydrant) and a water receptacle (e.g. a tanker truck) so as to measure the volume of water flowing between the source and the receptacle. In order to reliably prevent the back flow of non-potable water from the receptacle to the water supply of a municipality, the water meter is provided with a first check valve at the inlet end thereof ahead of (i.e. upstream from) the water register and a second check valve at the outlet end behind (i.e. downstream from) the water register. A flat screen follows the first check valve in the flow path, and a wave-shaped strainer is located between the flat screen and the water register. The flat screen and the wave-shaped strainer cooperate to slow and smooth the stream of water from the source to enable the water register to provide an accurate reading of water consumption.

5 Claims, 3 Drawing Sheets

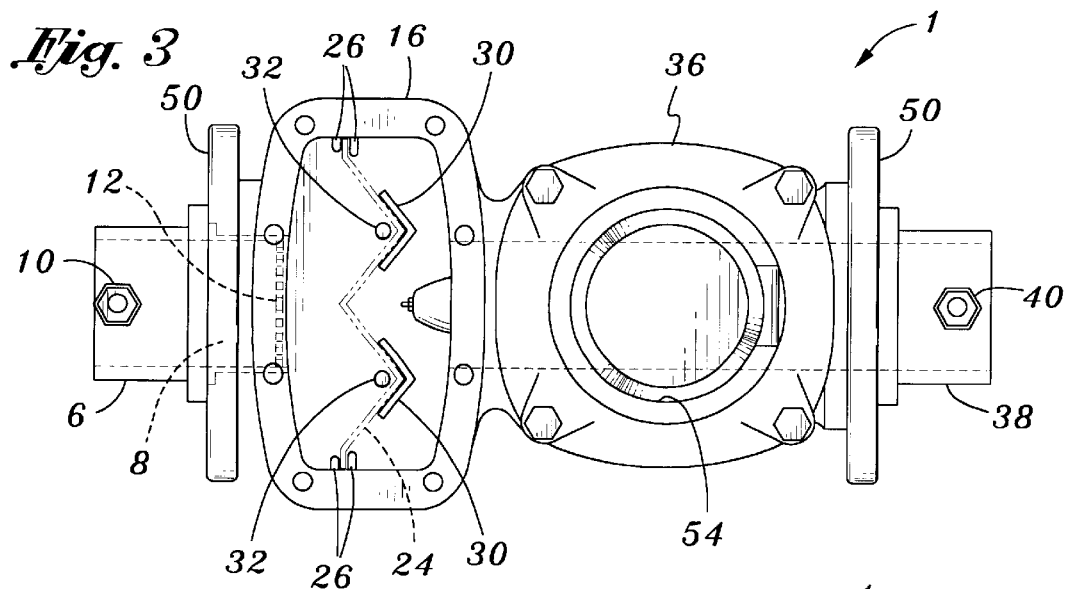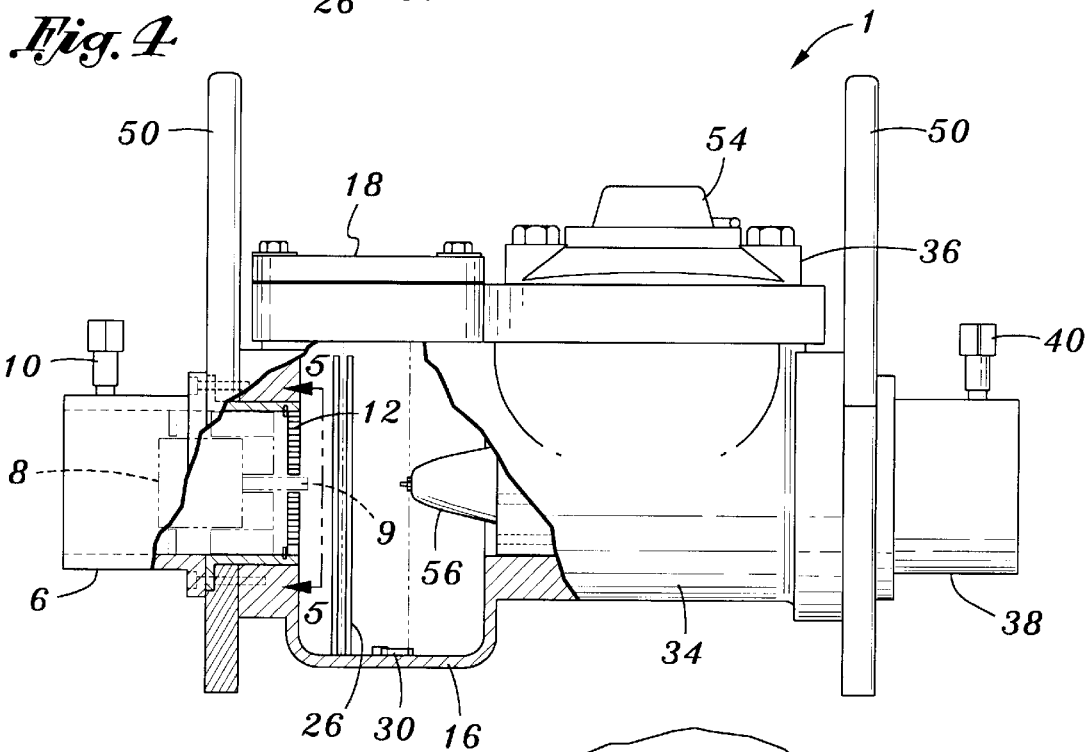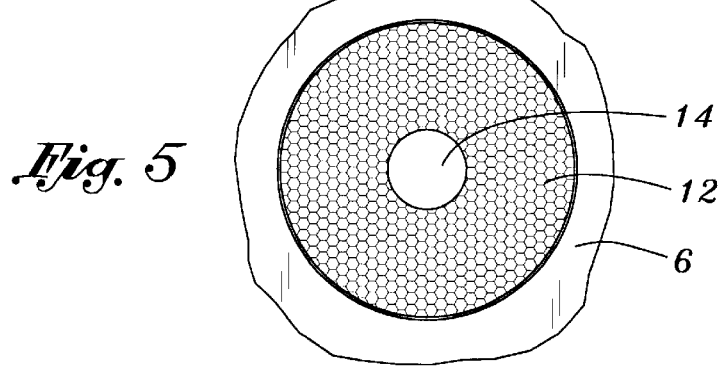

TWIN CHECK VALVE WATER METER

BACKGROUND OF THE INVENTION

1. Field of the Invention

This invention relates to a twin check valve water meter having a pair of check valves that are strategically positioned at both the inlet and outlet ends thereof. The twin check valve water meter is connected between a source of water (e.g. a fire hydrant) and a water receptacle (e.g. a tanker truck) and adapted to prevent back flow and the possibility of introducing non-potable water from the tanker truck to the water supply of a municipality via the fire hydrant.

2. Background Art

Water meters have long been employed to measure the volume of water that is taken from a source. For example, a tanker truck used by fire departments and construction companies must have an available supply of water to be transported from place-to-place and delivered on demand. Because of the large volume of water to be consumed, such tanker trucks are typically filled at a fire hydrant. A water meter is coupled to the fire hydrant so as to measure the volume of water that is withdrawn from the water supply of a local municipality. Once the truck is filled, an indication of water use is recorded so that the municipality can issue a charge to the user in order to be reimbursed for the water that has been consumed via the fire hydrant.

During the process of filling the tanker truck, a rupture in the water main of the municipality to which the fire hydrant is linked has been known to cause the water stored within the tanker truck to be suctioned therefrom and introduced back to the municipal water supply. Such back flow of water from the tanker truck is often characterized by potentially harmful bacteria. That is to say, by the time the water main has been repaired, the water supply of the municipality may be contaminated by the back flow of water from the tanker truck via the fire hydrant such that residents of the municipality could be subjected to potential illness.

To reduce the possibility of back flow of non-potable water from a tanker truck to a water supply at a fire hydrant, water meters have incorporated unidirectional flow control devices. So as not to effect the accuracy of the water register, conventional water meters that are coupled to a fire hydrant are known to include a pair of check valves located at the outlet end thereof and downstream from the register. Placing the pair of check valves at the outlet end results in conventional water meters being undesirably long, heavy and bulky. What is more, a sometimes turbulent, uneven flow of water is supplied to the water meter from the fire hydrant so as to adversely effect the accuracy of the water meter register such that the charges to the water user could be erroneous.

Therefore, what is needed is a water meter to be coupled to a fire hydrant and adapted to provide a smooth, linear flow of water from the fire hydrant to the water register and reliably prevent the back flow of non-potable water from a tanker truck to the fire hydrant while, at the same time, minimizing the size and weight of the water meter.

SUMMARY OF THE INVENTION

In general terms, a twin check valve water meter is disclosed having an inlet end to be coupled to a source of water (e.g. a fire hydrant) and an outlet end to be coupled to a water receptacle (e.g. a tanker truck) of the end user. The water meter includes a register by which to measure the volume of water flowing therepast so that the end user can be billed for its water consumption.

Water from the fire hydrant is received by the water meter at an inlet gate valve housing which encloses an inlet gate valve. From the inlet gate valve housing, the water flows into an inlet check valve housing containing a first check valve. The inlet check valve housing is located ahead of (i.e. upstream from) the water register. A flat perforated screen is located at the interface of the inlet check valve housing and a strainer housing. The strainer housing has a series of guide rails and blocks that cooperate to slidably receive and lock into place a perforated wave-shaped strainer. The strainer housing within which the strainer is disposed lies in fluid communication with a turbine housing of the twin check valve water meter. The water register sits atop the turbine housing and includes a turbine assembly to measure the volume of water flowing from the fire hydrant to the tanker truck. The twin check valve water meter also includes an outlet check valve housing containing a second check valve. The outlet check valve is located behind (i.e. downstream from) the water register. The outlet check communicates with an outlet gate valve housing which encloses an outlet gate valve.

Unlike conventional water meters, the twin check valve water meter of this invention has a check valve located at each of the inlet and outlet ends thereof (i.e. both upstream and downstream from the water register). Thus, not only will back flow from the tanker truck to the fire hydrant be reliably prevented, but the overall size and weight of the water meter may be advantageously reduced relative to such conventional water meters. Moreover, by locating the flat screen and wave-shape strainer in the flow path ahead of the water register, the sometimes turbulent water stream supplied from the fire hydrant will be slowed and smoothed to a linear flow, whereby to maximize the accuracy of the reading of the water register.

BRIEF DESCRIPTION OF THE DRAWINGS

FIG. 3 is a top view of the twin check valve water meter taken along lines 3—3 of FIG. 2 to show the wave-shaped strainer received and locked in place within the strainer housing;

FIG. 4 is a partially broken away side view of the twin check valve water meter of FIG. 3 showing a flat screen located at the intersection of an inlet check valve housing and the strainer housing; and FIG. 5 is a cross-section taken along lines 5—5 of FIG. 4.

DETAILED DESCRIPTION

Figure 1:
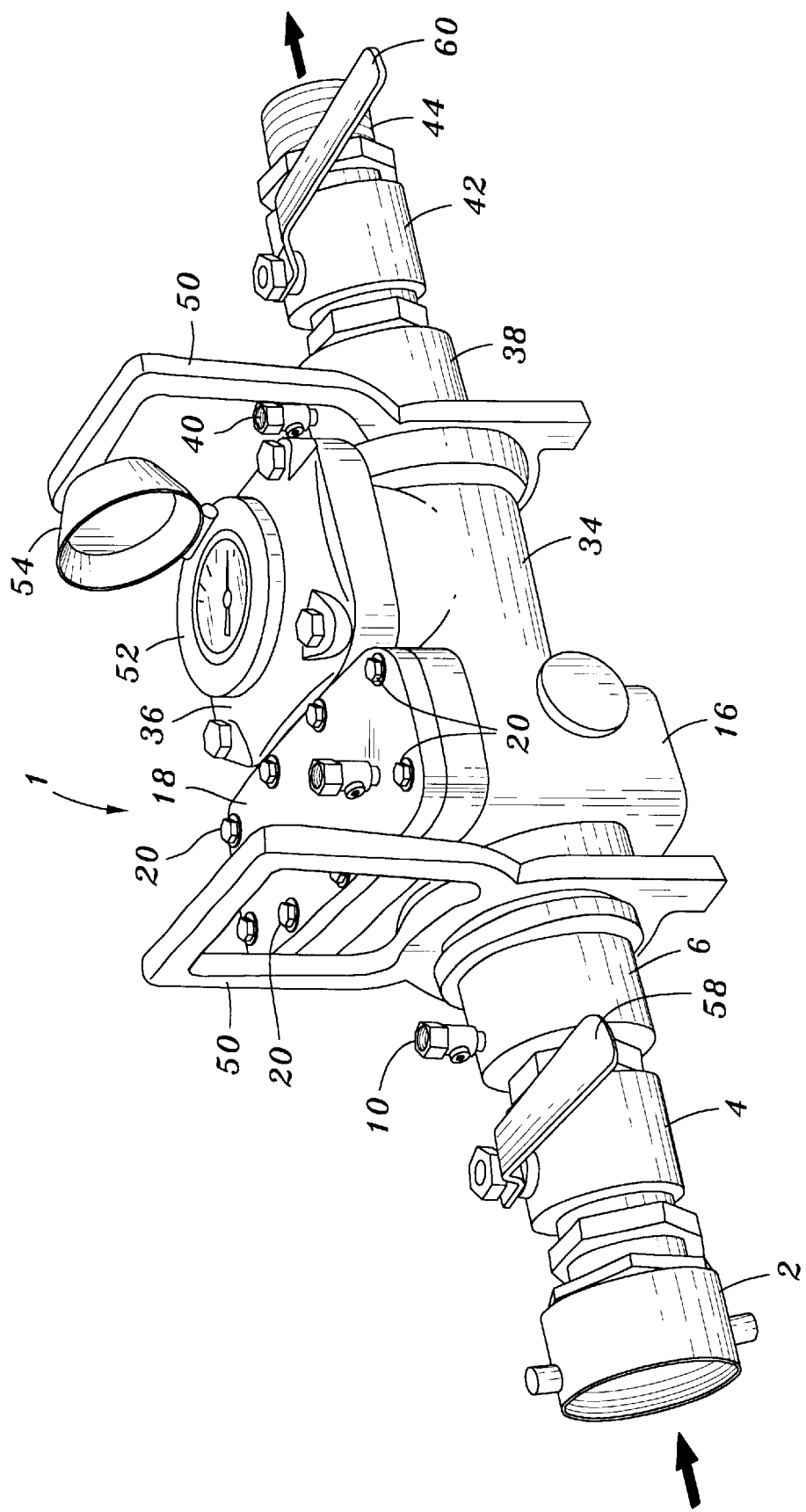
FIG. 1 is a perspective view of the twin check valve water meter which forms the present invention.
Figure 2:
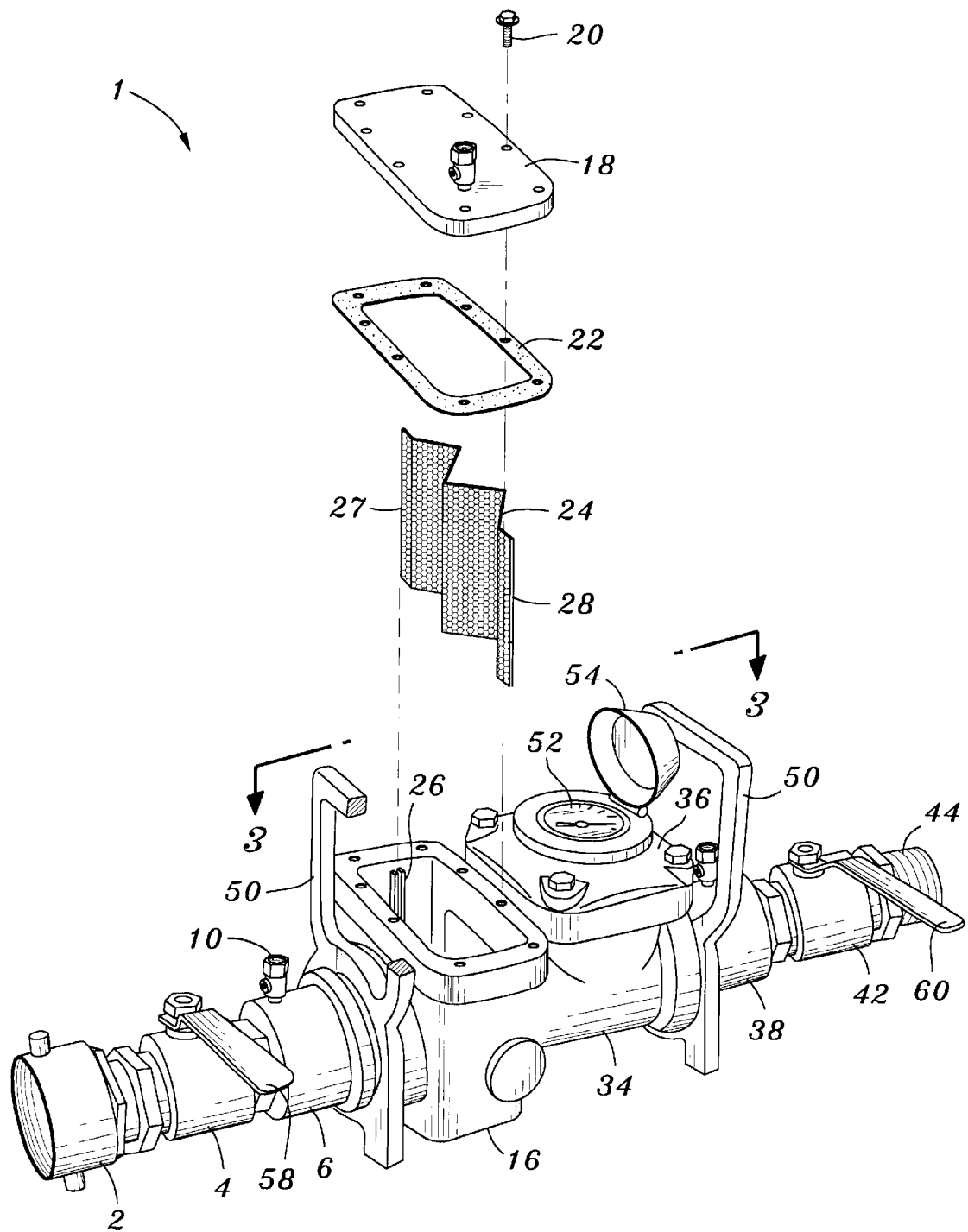
FIG. 2 is a partially exploded view of the twin check valve water meter of FIG. 1 showing a wave-shaped strainer to be slidably received within a strainer housing.

The twin check valve water meter 1 which forms the present invention is initially described while referring to FIGS. 1 and 2 drawings. The twin check valve water meter 1 includes a pair of handles 50 by which the water meter may be lifted and transported from place-to-place. A conventional turbine controlled, water meter register 52 having a cap closure 54 pivotally connected thereto is provided to measure the volume of water flowing through water meter 1 and consumed by a user.

The twin check valve water meter 1 also includes a threaded swivel coupler 2 at an inlet end thereof to be mated to a hose through which a supply of water is received from a suitable source, such as a fire hydrant. The swivel coupler 2 lies in fluid communication with an inlet gate valve housing 4 that encloses a conventional gate valve (not shown). The gate valve within housing 4 is moved between opened and closed positions by a conventional manually operated tool 58 to control the fluid connection of the fire hydrant to the inlet end of the water meter 1.

As will be described in greater detail hereinafter, the water meter 1 of this invention is characterized by a pair of check valves. In this regard, the pair of check valves are strategically located to protect members of the public being served by a municipality which owns the fire hydrant to which the twin check valve water meter 1 is coupled. That is to say, to minimize the risk that non-potable water containing potentially harmful bacteria could flow back from a water receptacle, such as a tanker truck, or the like, to the fire hydrant and into the municipal water supply, water meter 1 is provided with both inlet and outlet check valves.

To this end, it has been found that back flow of non-potable water from the tanker truck to the fire hydrant can be best achieved by positioning an inlet check valve at the inlet end of the water meter 1 ahead of the water meter register 52, as opposed to locating each one of a pair of check valves in conventional flow meters at the outlet end and downstream from the water meter register. More particularly, an inlet check valve housing 6 of the twin check valve water meter 1 lies in fluid communication with the gate valve housing 4. An inlet check valve 8 (best shown in FIG. 4) is enclosed by inlet check valve housing 6. Inlet check valve 8 is a conventional spring loaded unidirectional flow control device and is commercially available from Febco of Fresno, Calif. Inlet check valve housing 6 carries a test cock 10 by which to periodically check the reliability of the inlet check valve 8 according to the usual practice.

Referring briefly to FIGS. 4 and 5 of the drawings, the inlet check valve 8 is shown aligned with a flat perforated screen 12 that is fastened to the rear of inlet check valve housing 6. Therefore, the screen 12 is located in the fluid path of the water meter 1 between the inlet check valve 8 and a soon-to-be described strainer 24 that is enclosed by a strainer housing 16. The screen 12 is manufactured from a metallic mesh and includes a central aperture 14 through which the plunger 9 of inlet check valve 8 is received. It has been found that locating the screen 12 at the rear of check valve housing 6 advantageously eliminates a jetting effect that is introduced as water passes through inlet check valve 8.

As an important feature of this invention, the twin check valve water meter 1 includes the aforementioned strainer housing 16 which encloses a perforated strainer 24 and lies in fluid communication with the inlet check valve housing 6. As is best shown in FIG. 2 of the drawings, the strainer housing 16 has a top cover plate 18 removably secured thereto by means of suitable fasteners 20. A resilient gasket 22 is disposed between cover plate 18 and strainer housing 16 to prevent leakage.

The strainer 24 is retained within the strainer housing 16 so as to be disposed within the flow path through the twin check valve water meter 1 between the screen 12 and the water meter register 52. Like the flat screen 12, the strainer 24 is manufactured from a metallic mesh. However, unlike the flat screen 12, the strainer 24 is wave-shaped to maximize the surface area thereof and reduce any turbulence in the water that is supplied from the fire hydrant.

Pairs of guide rails (designated 26 and best shown in FIG. 4) extend vertically along opposite sides of the strainer housing 16 in which to slidably receive the respective opposite edges of the strainer 24. A pair of V-shaped blocks (designated 30 and best shown in FIG. 3) extend upwardly from the bottom of strainer housing 16. Each of the V-shaped blocks 30 cooperates with an opposing post 32 so as to receive the bottom of wave-shaped strainer 24 therebetween, whereby the strainer 24 is locked in place within the strainer housing 16.

The strainer housing 16 within which the strainer 24 is locked lies in fluid communication with a turbine housing 34. The water meter register 52 is seated upon a removable cover 36 of the turbine housing 34 and includes the usual turbine assembly (designated 56 in FIG. 4) having a propeller (not shown) that is rotated in response to the volume of water flowing through the flow path of water meter 1, an indication of which is provided by the water register 52.

It is important to recognize that the previously described inlet check valve 8, screen 12 and strainer 24 are all located in the flow path at the inlet end of the twin check valve water meter 1 and upstream from the register 52. By virtue of the combination of flat screen 12 and wave-shaped strainer 24 positioned adjacent one another after inlet check valve 8, the speed of the incoming water supplied from the fire hydrant will be slowed. Moreover, should the incoming water be turbulent, the combination of screen 12 and strainer 24 will smooth the flow and produce a linear stream. Thus, the accuracy of the reading provided by register 52 will be maximized in order that the water user will be fairly charged on the basis of the actual volume of water consumed.

The aforementioned benefit provided by the flat screen 12 and wave-shaped strainer 24 of producing a low speed, linear flow allows the inlet check valve 8 to be located upstream from the water register 52 without affecting the accuracy of the register. Thus, unlike conventional water meters having a pair of check valves, each of which being located downstream from the water register, the overall size and weight of the twin check valve water meter 1 of this invention may be advantageously reduced relative to such conventional water meters while reliably preventing back flow from the tanker truck to the water supply of the municipality.

The twin check valve water meter 1 has an outlet check valve housing 38 lying in fluid communication with the turbine housing 34. A spring load outlet check valve (not shown), which is identical to the inlet check valve 8, is located within the outlet check housing 38 so as to lie in the flow path between water register 52 and an outlet gate valve housing 42. A test cock 40 communicates with the outlet check valve housing 38 by which to test the reliability of the outlet check valve located therewithin. The outlet gate valve housing 42 encloses a conventional gate valve (not shown) which is moved between opened and closed positions in the flow path by means of a manually operated tool 60 to control the fluid connection of the outlet end of water meter 1 to the tanker truck.

The outlet gate valve housing 38 lies in fluid communication with the outlet end 44 of water meter 1. The outlet end 44 is threaded so as to be coupled to a hose which delivers a measured volume of water from the twin check valve water meter 1 to the tanker truck according to the improvements described above.

I claim:

1. For a water meter having an inlet end to be coupled to a source of water, an outlet end to be coupled to a water receptacle to receive water from said source, and a water register located between said inlet and outlet ends to measure the volume of water flowing between the source of water and the water receptacle, the improvements comprising:

a first check valve at the inlet end of said water meter and positioned between the source of water and the water register;

a perforated screen positioned between said first check valve and the water register;

a perforated strainer positioned between said perforated screen and the water register, each of said first check valve, said perforated screen and said perforated strainer located in a fluid flow path at the inlet end of said water meter upstream from the water register so as to slow the speed and reduce turbulence of the water flowing from the source to the water register; and a second check valve at the outlet end of said water meter and positioned between the water register and the water receptacle.

2. The water meter recited in claim 1, wherein said perforated strainer ha a wave shape.

3. The water meter recited in claim 1, also comprising a strainer housing located between said first check valve and the water register, said strainer housing having at least one pair of guide rails for slidably and removably receiving and locking said perforated strainer within said strainer housing.

4. The water meter recited in claim 1, wherein said first check valve, said perforated screen, said perforated strainer, said water register and said second check valve all lie in fluid communication with one another along a linear flow path.

5. The water meter recited in claim 1, also comprising a check valve housing to enclose said first check valve, said perforated screen attached to said check valve housing and having a central aperture formed therein, and said first check valve having a plunger received through the central aperture of said perforated screen.

* * * * *